United States Patent [19]

O'Connell

[11] Patent Number: 5,693,380

[45] Date of Patent: Dec. 2, 1997

[54] FLOWER HOLDER WITH DRAIN WATER RECEIVER

[76] Inventor: Donald L. O'Connell, 605 Purchase St., Rye, N.Y. 10580

[21] Appl. No.: 400,259

[22] Filed: Mar. 8, 1995

[51] Int. Cl.$^6$ .................................................. A47G 7/00
[52] U.S. Cl. ................... 428/3; 47/41.12; 428/23; 428/34.1
[58] Field of Search .................. 428/3, 18, 34.1, 428/19, 23; 47/41.12

[56] References Cited

U.S. PATENT DOCUMENTS

| | | |
|---|---|---|
| 3,007,282 | 11/1961 | Galesky .................. 428/18 X |
| 3,962,825 | 6/1976 | O'Connell .................. 47/41.12 |
| 4,004,367 | 1/1977 | O'Connell .................. 47/41.12 |
| 4,058,929 | 11/1977 | O'Connell .................. 428/3 X |

Primary Examiner—Henry F. Epstein
Attorney, Agent, or Firm—Brooks Haidt Haffner & Delahunty

[57] ABSTRACT

A holder for water absorbing blocks in which articles requiring moisture, such as flowers, can be inserted for display purposes. The holder includes a back member with peripheral walls forming a cavity in which the blocks are inserted and a receptacle at the lower end and outside a wall of the back member for receiving a retaining water from the block members which flows over the wall.

7 Claims, 2 Drawing Sheets

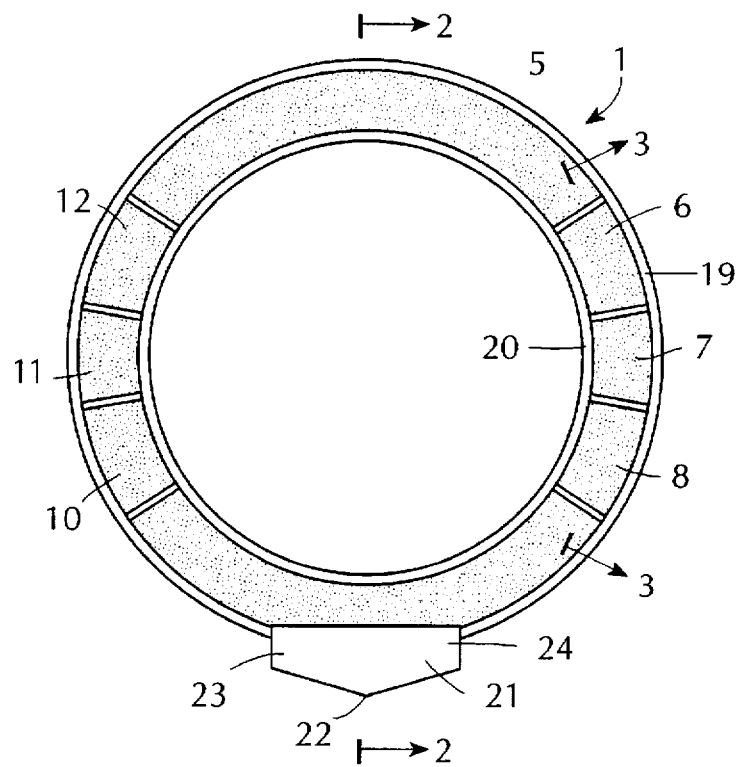
FIG. 1
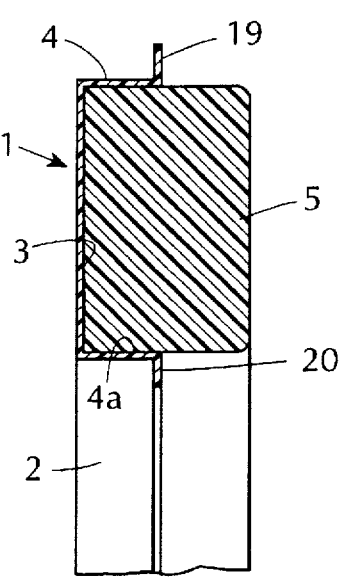
FIG. 2
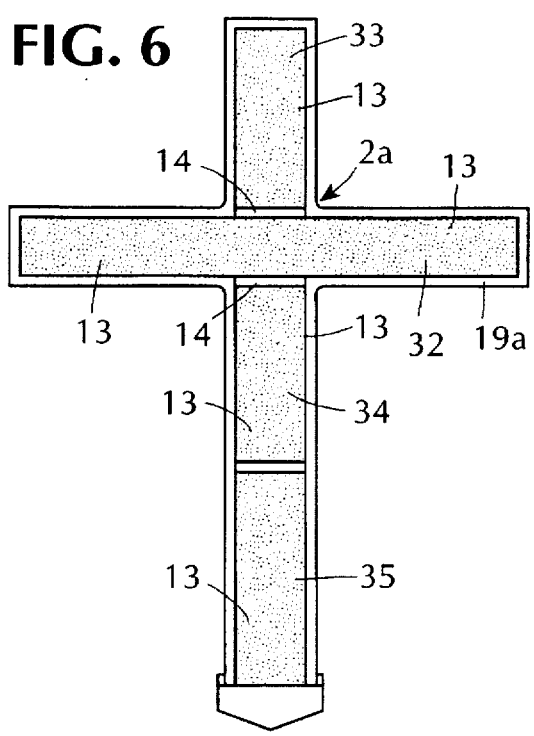
FIG. 6
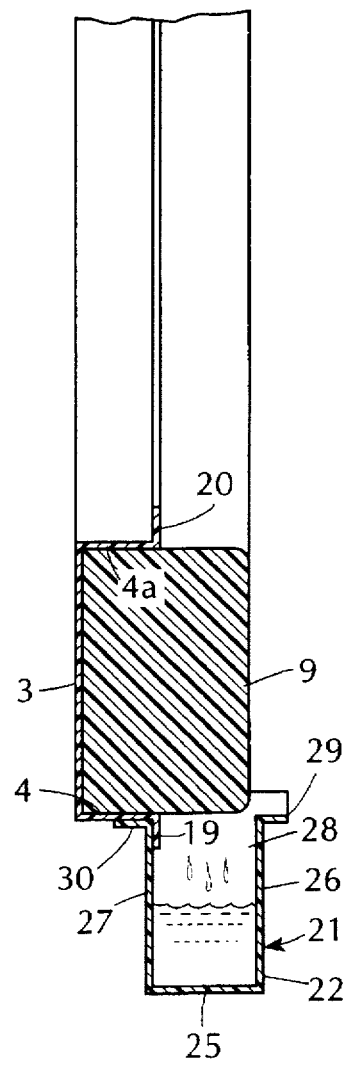

FLOWER HOLDER WITH DRAIN WATER RECEIVER

FIELD OF THE INVENTION

This invention relates to holders for flowers which holders have a base which receives plastic foam blocks which can be moistened and into which the stems of the flowers are inserted.

BACKGROUND OF THE INVENTION

Holders for flowers and other items requiring moisture after the flowers have been inserted in the holder are well known in the art. See, for example, my prior U.S. Pat. Nos. 3,962,825; 4,004,367 and 4,058,929. In general, such holders comprise a water impermeable, molded, plastic back member in the shape of a cross, a heart, a rectangle, a wreath, etc. which is cup or U-shaped in cross-section. The cavities in the member are closed at their ends to retain water, and the cavities receive water retaining blocks, such as plastic foam blocks. The blocks are retained in the back member by various devices, such as an adhesive, tapes or a plastic film or by providing a push-fit between the blocks and the walls of the cavities.

After the blocks are inserted into the cavities and preferably, prior to pushing the items of the flowers into the foam blocks, water is supplied to the blocks. The stems of the flowers are inserted into the water containing blocks, and the flowers are prevented from wilting, at least for many hours, by the moisture in the blocks.

When the holders are supported other than horizontally, e.g. tilted or vertical, so that a portion or portions of the blocks are lower than the remainder of the block or blocks, water in the blocks flows due to gravity to the lower portion or portions of the block or blocks. When the lower portion becomes saturated, water flows or drips out of the lower portion of the back member, over a wall thereof, which is undesirable.

Attempts have been made to reduce such undesirable water overflow, such as by using several spaced blocks in series in a cavity or by providing spaced grooves in a foam block which extend transversely of the length of the block and substantially from the front face to the rear surface of the block.

While such attempts have been partially successful, the problem of water overflow at the lower portion of a holder has not been overcome.

BRIEF SUMMARY OF THE INVENTION

One object of the invention is to prevent water from dripping or flowing out of a holder for flowers or other items which has a water containing foam block or blocks.

In accordance with the invention, a water impermeable cup or receptacle, such as a plastic cup or receptacle is secured to, or formed integral with, the portion of the water impermeable back member which will be, or be most likely to be, the lowest portion, when the holder is in use, in a position in which it can receive excess water flowing or dripping out of such portion of the back member.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 1 is a face view of a holder of the invention in the form of a wreath or annulus;

FIG. 2 is an enlarged cross-sectional view of the embodiment shown in FIG. 1 and is taken along the line 2—2 indicated in FIG. 1;

FIG. 6 illustrates a holder of the invention in the shape of a cross.

Figure 3:
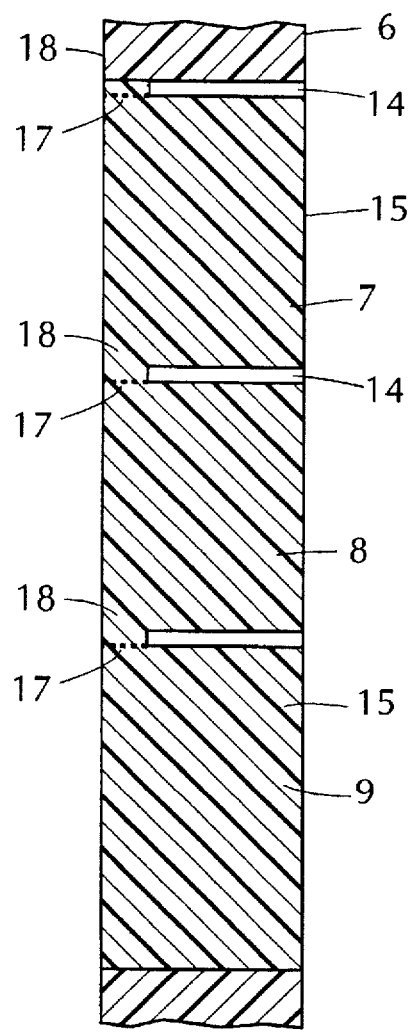
FIG. 3 is a fragmentary, cross-sectional view of one form of water-receiving foam blocks which can be used in the various embodiments of the invention and is taken along the line 3—3 indicated in FIG. 1.

The annular, or wreath-shaped, holder 1 of the invention shown in FIGS. 1 and 2 comprises a vacuum formed, water impervious, thermoplastic back member 2 of a conventional type. The back member 2 has a back wall 3 and a pair of side walls 4 and 4a which form a closed annular channel or cavity into which a plurality of plastic foam blocks 5–12 which absorb water are inserted. The blocks 5 and 9 are relatively long blocks whereas the blocks 6–8 and 10–12 are relatively short blocks but the blocks can be all of the same length or of different lengths.

The blocks 5–12 can be held in place by reason of the friction between the blocks 5–12 and the side walls 4 and 4a or by an adhesive between the blocks 5–12 and one or more of the walls 3, 4 and 4a. Alternatively, they can be held in place by tapes, such as transparent plastic tapes having an adhesive on the surface thereof engaging the blocks and the back member 1, as illustrated by the tapes 13 in FIG. 6.

The blocks 5–12 can be separate blocks or the blocks can be separated by grooves 14 extending from the front faces 15 thereof substantially to the back face 16 thereof. Alternatively, one or more of the blocks can be cut through from the grooves 14 to the back face 16, as indicated by the dotted lines 17 in FIG. 3, so that the blocks are separate and are separated by projections 18. The purpose of the grooves 14 is to retard the flow of water from one block to the next block.

The height of a block above the back wall 3, i.e. the distance between the front face 15 and the back face 16 of the blocks, normally is greater than the height of the side walls 4 and 4a so that each block 5–12 extends above the side walls 4 and 4a, as shown in the drawings. However, the height of the blocks 5–12 can be less and can be equal to or smaller than the height of the side walls.

For stiffening purposes, since the thickness of the back member 2 material is relatively small, the inner and outer peripheries of the member 2 can be provided with flanges or rims 19 and 20.

The holder 1 of the invention is provided with a cup or receptacle 21 which receives and retains water exiting from or dripping at the bottom block 9, the holder 1 being shown in the drawings disposed in a vertical position. While the receptacle 21 can have any desired shape, preferably it has the shape indicated in FIG. 1, i.e. it is deeper at its central portion 22 than at its ends 23 and 24. Preferably, the flange 19 of the back member 2 extends into the receptacle 21 as indicated in FIGS. 1 and 2.

The receptacle 21, preferably, is vacuum formed from a thermoplastic material which can be the same as the thermoplastic material of the back member 2. The receptacle 21 has a bottom wall 25, front and back walls 26 and 27 and side walls, one of which, 28, is shown in FIG. 2, and stiffening flanges 29 and 30. The receptacle can be secured to the back member 2 at the flanges 19 and 30 by an adhesive or by spot welding. The peripheral extent of said receptacle 21 in the direction of the periphery of said base member 2 preferably is small, e.g. one-eighth to one-tenth, of the periphery of said back member and can be as small as one-twelfth and as large as one-sixth in preferred embodiments.

Normally, the blocks 5–12 are saturated with water with the holder 1 disposed horizontally, but, thereafter, when the holder 1 is disposed vertically with the receptacle 21 lowermost, water gradually flows downwardly, by reason of gravity from the upper blocks 5–8 and 10–12 to the block 9 which, when saturated, can no longer retain the water. Also, water in the block 9 flows to its lowermost portion. Accordingly, at least after a short time after the holder 1 is disposed vertically, water drains from the block 9, and without the receptacle 21, falls on objects therebelow, such as the floor, which is not desirable for many reasons.

With the receptacle 21 on the holder 1 of the invention, the water from the block 9 drops into the receptacle 21 where it is retained. It is not necessary that the receptacle 21 have a large capacity in order to prevent water overflow therefrom for several hours. Thus, I have found that the internal capacity, i.e. water receiving volume, of the receptacle 21 can be on the order of four cubic inches for a wreath having a block 5–12 volume of 180 cubic inches without overflow for about 4 hours provided that the blocks 5–12 have not been oversaturated when water is first supplied thereto. Thus, the ratio of the volume of the blocks 5–12 to the water capacity of the receptacle 21 can be approximately 45 to one for satisfactory performance. Of course, it is desirable to keep the receptacle 21 size as small as possible, and the preferred ratio for the volume of the blocks 5–12 to the water receiving volume, without overflow, of the receptacle 21 is in the range from 60 to one to 30 to one.

Figure 4:
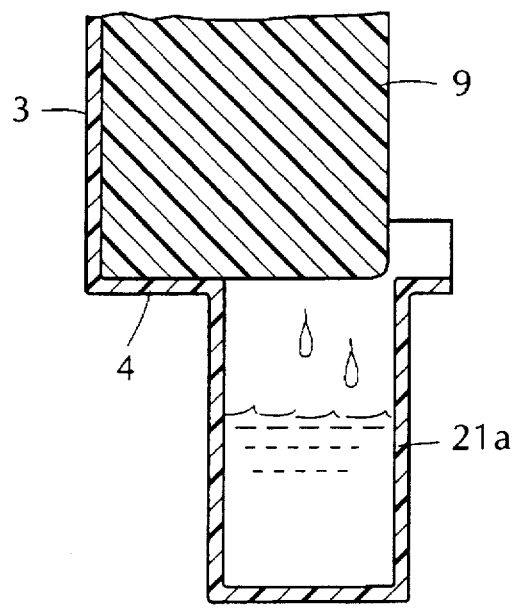
FIG. 4 is a fragmentary, cross-sectional view illustrating a further embodiment of the invention.
Figure 5:
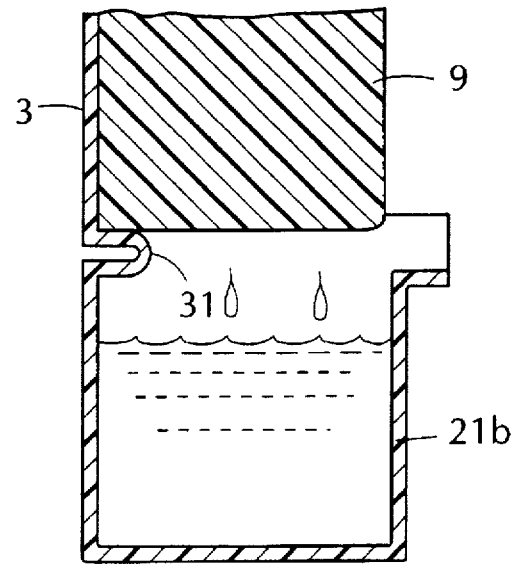
FIG. 5 is a fragmentary, cross-sectional view illustrating a further embodiment of the invention.

In the embodiment of the invention shown in FIGS. 1–3, the receptacle 21 is separately formed and secured to the back member 2. It is possible to form the back member 2 and the water receptacle in one-piece so that the back member 2 and the receptacle are unitary as illustrated in FIGS. 4 and 5. In FIG. 4, the receptacle 21a is formed as an extension of the sidewall 4. In FIG. 5, the receptacle 21b is formed as an extension of the back wall 3. In the embodiment of FIG. 5, it may be desirable to provide a ridge 31 to aid in preventing slippage of the block 9 into the receptacle.

FIG. 6 illustrates the application of the invention to a holder with a back member with blocks having the shape of a cross. Of course, the invention is applicable to holders having other shapes. With such other shapes, such as the cross shown in FIG. 6, the principles described in connection with FIGS. 1–5 are the same, namely, the holder has a receptacle externally of the back member which forms a water receiving cavity for receiving water from the foam blocks which water is not retained thereby because of gravity effects.

The back member 2a shown in FIG. 6 is water impermeable and preferably, is vacuum formed from a thin sheet of thermoplastic in a known manner. The back member 2a has a flange 19a connected to sidewalls (not shown) similar to the sidewalls 4 and 4a which, in turn, are connected to a back wall (not shown) similar to the back wall 3. The side and back walls form a cavity for retaining water and which has an open side for receiving plastic foam, water absorbing blocks 32–35. An overflow water receiving receptacle 21c is at the lower end of the back member 2a and can be as described in connection with FIGS. 1–5.

Although preferred embodiments of the present invention have been described and illustrated, it will be apparent to those skilled in the art that various modifications may be made without departing from the principles of the invention.

I claim:

1. A holder for articles requiring moisture comprising:

a back member having a back wall and having spaced side walls extending in the same direction from and transversely to said back wall, said back wall and surfaces of said side walls defining a first water receiving and retaining cavity with a first open side, said side walls having ends at a predetermined distance from said back wall;

at least one water absorbing block in said cavity which is penetrable by said articles; and water receiving means forming a second water receiving and retaining cavity with a second open side, said water receiving means being secured to said back member at a side of one of said side walls opposite from the surface of said one of said side walls which defines said first cavity and disposed with at least a portion of said second open side farther from the back wall than the end of said one of said side walls and adjacent said block member for receiving and retaining water exiting from said block member over said end of said one of said side walls, said water receiving means having a peripheral extent in the direction of the periphery of said back member which is small relative to the peripheral extent of said back member.

2. A holder as set forth in claim 1 wherein said water absorbing block has a water receiving volume and said water receiving means has a water receiving volume less than one-thirtieth of said volume of the blocks in said first cavity.

3. A holder as set forth in claim 2 wherein said water receiving volume of said water receiving means is in the range from one-thirtieth to one-sixtieth of said water receiving volume of said water absorbing block.

4. A holder as set forth in claim 1 wherein said holder has a plurality of plastic foam blocks disposed end-to-end in said first cavity, each of said blocks having an empty space between its ends and the ends of the next adjacent blocks.

5. A holder as set forth in claim 1 wherein said water receiving means is a receptacle which is unitary with said back wall of said back member.

6. A holder as set forth in claim 5 further comprising a ridge on said back member intermediate said block and said receptacle for preventing slippage of said block into said water receiving means.

7. A holder as set forth in claim 1 wherein said block has a portion spaced from said back wall greater than said predetermined distance and wherein said second cavity opens toward said portion for receiving and retaining water from said portion.

* * * * *